United States Patent [19]

Woznow et al.

[11] Patent Number: 5,107,598

[45] Date of Patent: Apr. 28, 1992

[54] SURFACE PROFILER

[76] Inventors: Leon J. Woznow, 1262 Eastview Road, North Vancouver, British Columbia, Canada, V7J 1L6; Paul O. Toom, 300 Murphy Drive West, Delta, British Columbia, Canada, V4M 3P2

[21] Appl. No.: 578,079

[22] Filed: Sep. 4, 1990

[51] Int. Cl.$^5$ .................................. G01B 7/00
[52] U.S. Cl. .......................... 33/521; 33/775; 73/146
[58] Field of Search ............. 33/521, 523, 775, 773, 33/779, 338, 1 H; 73/146

[56] References Cited

U.S. PATENT DOCUMENTS

| | | |
|---|---|---|
| 1,837,609 | 12/1931 | Carter . |
| 2,175,496 | 10/1939 | Troyer .................................. 33/523 |
| 2,344,216 | 3/1944 | Raydon ................................. 33/523 |
| 2,647,323 | 8/1953 | Johnson et al. ....................... 33/775 |
| 3,038,332 | 6/1962 | Grossmann ............................ 73/146 |
| 3,151,235 | 9/1964 | Greenshields . |
| 3,266,302 | 8/1966 | Spangler et al. ...................... 73/146 |
| 3,353,404 | 11/1967 | Swift .................................... 73/146 |
| 3,364,579 | 1/1968 | Fisher . |
| 3,383,913 | 5/1968 | Swift .................................... 73/146 |
| 3,503,132 | 3/1970 | Fisher . |
| 3,882,607 | 5/1975 | Plasser et al. . |
| 3,888,118 | 6/1975 | Nims . |
| 3,983,746 | 10/1976 | Phillips et al. . |
| 4,137,638 | 2/1979 | Watts .................................... 33/523 |
| 4,288,926 | 9/1981 | Long et al. . |
| 4,403,419 | 9/1983 | Graves ................................... 33/523 |
| 4,577,494 | 3/1986 | Jaeggi . |
| 4,586,138 | 4/1986 | Mullenhoff et al. .................. 73/146 |
| 4,673,854 | 6/1987 | Patton et al. . |
| 4,674,327 | 6/1987 | Swindall et al. . |
| 4,691,565 | 9/1987 | Theurer . |
| 4,741,207 | 5/1988 | Spangler .......................... 33/521 X |
| 4,788,773 | 12/1988 | Palsgard et al. .................. 33/775 X |
| 4,858,329 | 8/1989 | Manor ................................... 33/775 |

FOREIGN PATENT DOCUMENTS 0229598  9/1963  Austria ................................. 33/775

OTHER PUBLICATIONS

"Product Engineering", Trailing Wheels Record Ground Condition, Jul. 31, 1961, p. 37, Felix Giordane.
Paper entitled "Assessment of the Dipstick for Measurement of Runway Profiles" dated Sep. 1987, by the Airports Authority Group.

*Primary Examiner*—William A. Cuchlinski, Jr.
*Assistant Examiner*—Alvin Wirthlin
*Attorney, Agent, or Firm*—John Russell Uren

[57] ABSTRACT

A surface profiling apparatus comprises a vehicle with a body having ground engaging wheels for supporting the body. An arm is pivotally mounted on the body at one end of the arm and a sensing wheel is rotatably connected to the arm at the other end thereof. Means for measuring the inclination of the arm relative to the horizontal position and distance measuring means for determining the distance travelled by the body are provided. A computer is included for correlating the distance and inclination data obtained, which results can be stored on a removable solid state memory device for transfer to an external computer for further analysis and calculations.

8 Claims, 9 Drawing Sheets

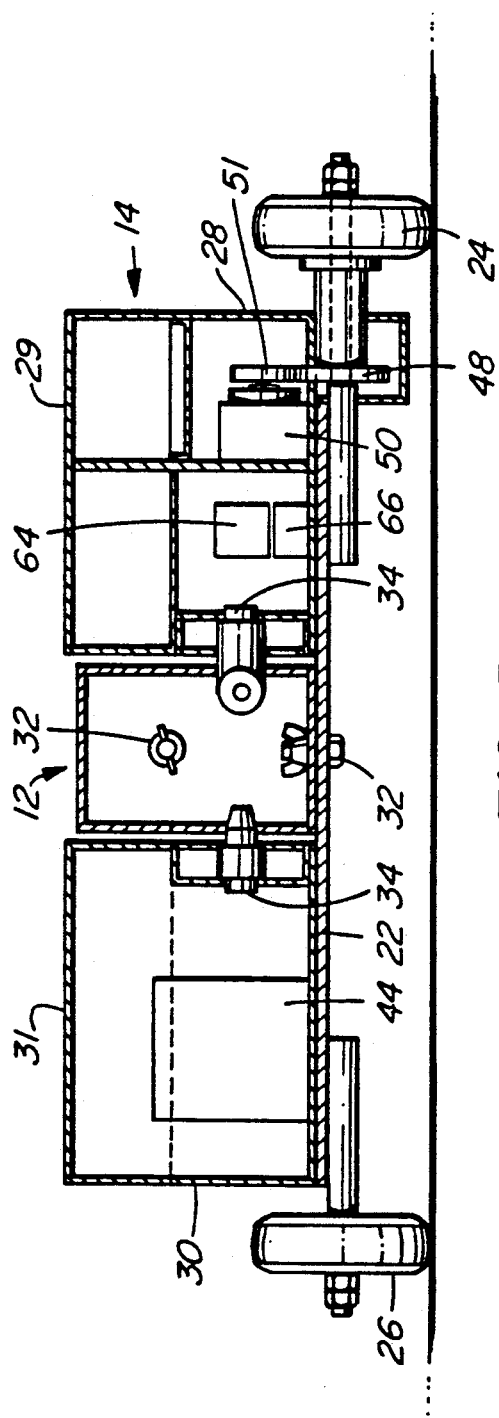
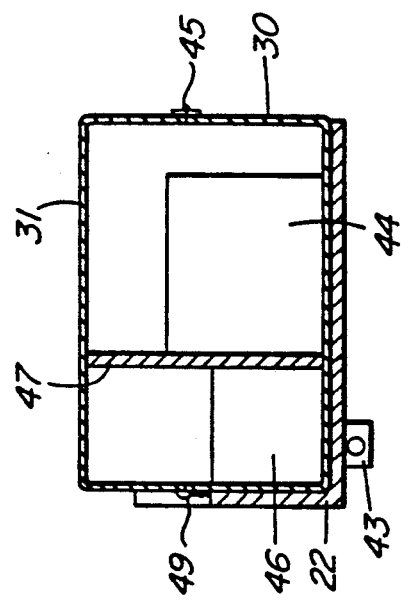
FIG. 5
FIG. 6

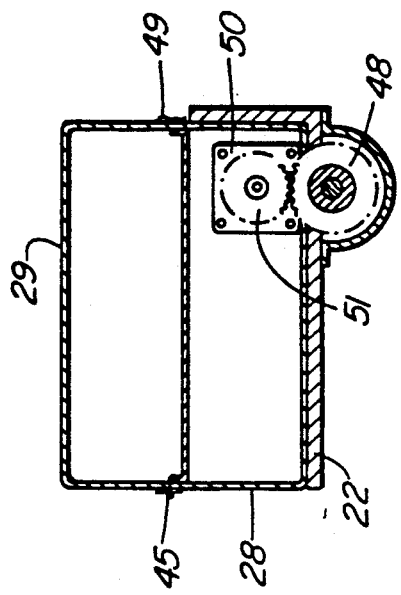
FIG. 8
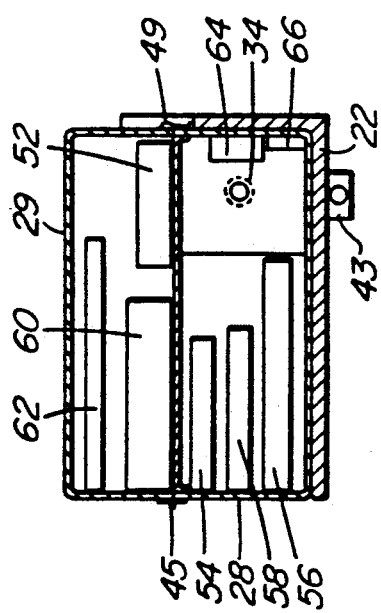
FIG. 7
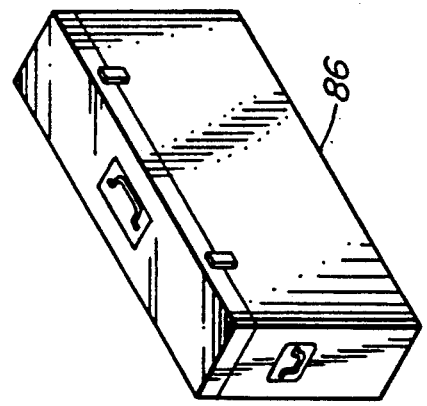
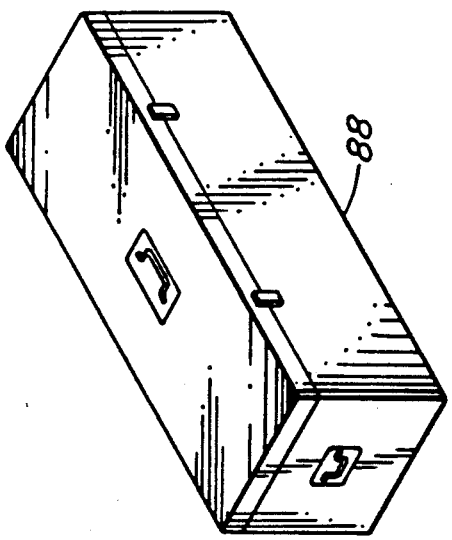
FIG. 9

FIG. II

SURFACE PROFILER

INTRODUCTION

This invention relates to the measurement of the profile of a surface. More specifically, but not exclusively, it relates to the measurement of the profile of an aircraft runway.

BACKGROUND OF THE INVENTION

Construction and maintenance of airport runways has become a critical consideration for airport design, in terms of aircraft safety and passenger comfort during take-off, landing and taxiing.

Stringent specifications, necessitated by larger and more heavily loaded aircraft, require runway construction to a surface tolerance of maximum 5 mm deviation from a 4.5 m long straight-edge.

To maintain a runway in working condition, the profile of the runway must be measured regularly. This profile is a set of points taken along the runway that describe relative elevation. National aviation authorities generally have profile standards which must be met.

The previous methods of determining the profile of a runway were laborious. These methods included: surveying with transits, measuring with a straight edge, and measuring with a level.

There are a number of problems with the previous methods. First, the measurements take an inordinate amount of time to complete. To manage this time effectively, the actual measurement phase is often minimized, with mathematical interpolation approximations used to fill in data points. Second, it takes a long time to analyze and use these data points. The difficulties inherent in the prior methods means that such tasks have sometimes been completed less frequently than might otherwise have been the case.

SUMMARY OF THE INVENTION

It is an object of the present invention to provide a method and apparatus for an easy and quick and yet accurate method of measuring the profile of a surface.

It is a further object of the invention to provide a method and apparatus whereby an inclinometer can be used for angular measurement in non static applications, i.e. wherein the inclinometer is subject to translational movement during angle measurement.

According to the invention, there is provided surface profiling apparatus which comprises a vehicle having a body and forward and rearward ground engaging wheel means on the body for translational movement of said body along a surface, means for measuring the angle of inclination, with respect to the horizontal position, of an imaginary line connecting the rotation axes of said forward and rearward wheel means, at predetermined intervals during said translational movement and means for recording said measurements.

Also according to the invention, there is provided surface profiling apparatus which comprises a vehicle having a body and forward and rearward ground engaging wheels for supporting the body on the ground, an arm pivotally connected to said body at one end of the arm, a sensing wheel for rolling along the ground rotatably connected to said arm towards the other end thereof, means for measuring the inclination of the arm relative to the horizontal position, distance measuring means for determining the distance travelled by said body during operation of said inclination measuring means and means for gathering distance and inclination data obtained from said inclination measuring means and said distance measuring means.

Further according to the invention, there is provided a method of obtaining the profile of a surface comprising the steps of obtaining inclination measurements, with respect to the horizontal position, of said surface at a plurality of locations positioned at predetermined distance intervals, transmitting said measurements to a processing device, processing said measurements and storing said processed measurements.

Also according to the invention, there is provided a method of obtaining the profile of a surface comprising the steps of moving a vehicle having a body and forward and rearward ground engaging wheel means on the body, over the surface to effect translational movement along the surface; measuring the angle of inclination, with respect to the horizontal position, of an imaginary line connecting the rotation axes of said forward and rearward wheel means at predetermined intervals during said translational movement; and recording said measurements.

Further objects and advantages of the invention will become apparent from the description of a preferred embodiment of the invention below.

BRIEF DESCRIPTION OF THE DRAWINGS

FIG. 5 is a section taken along the lines V—V in FIG. 2.

FIG. 6 is a section taken along the lines VI—VI in FIG. 2.

FIG. 7 is a section taken along the lines VII—VII in FIG. 2.

FIG. 8 is a section taken along the lines VIII—VIII in FIG. 2.

FIG. 9 is an isometric view of a set of cases for containing the profiler of FIG. 1.

DESCRIPTION OF A SPECIFIC EMBODIMENT

Figure 1:
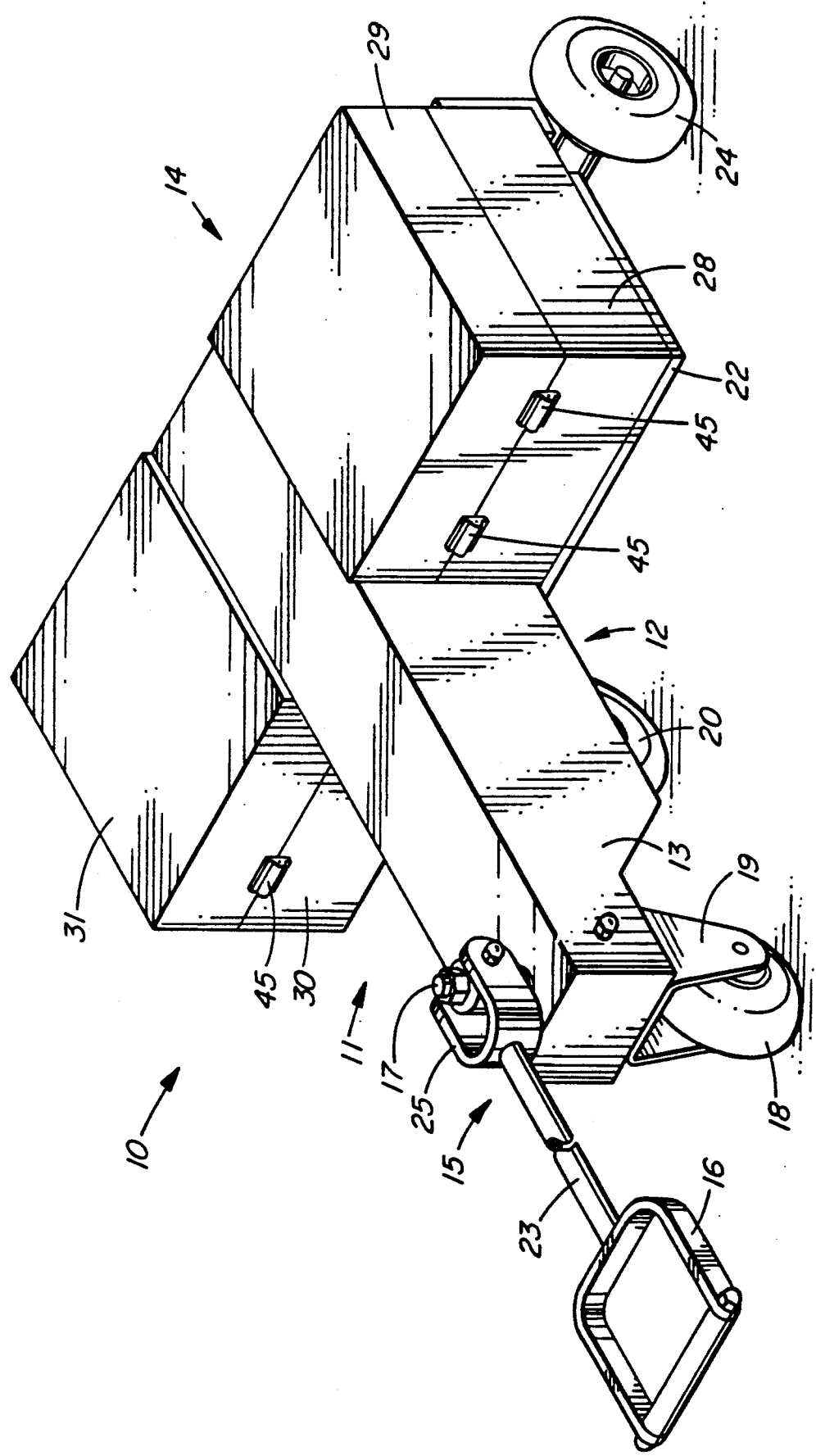
FIG. 1 is an isometric view of a surface profiling apparatus or profiler according to the invention.
Figure 2:
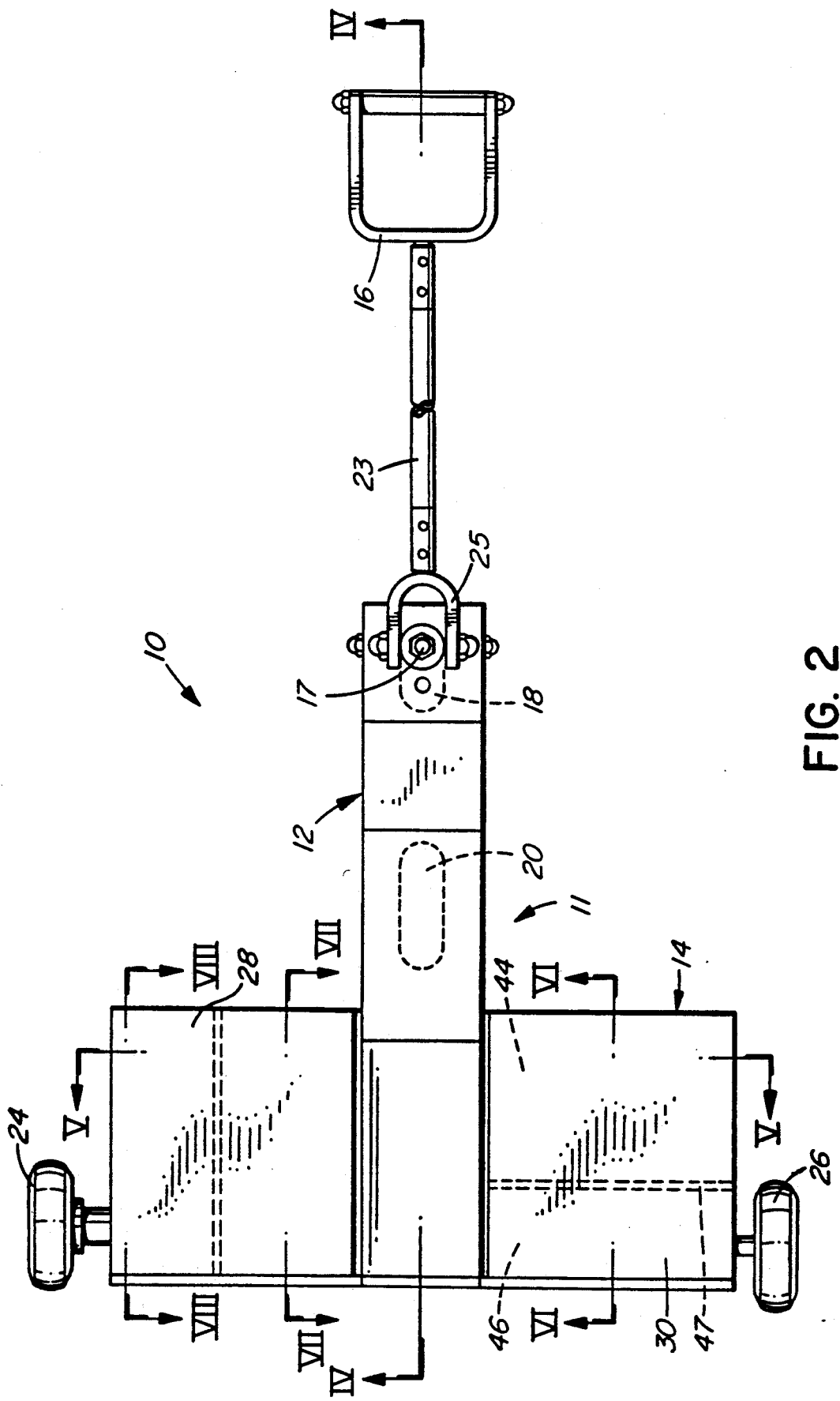
FIG. 2 is a plan view of the profiler of FIG. 1.
Figure 3:
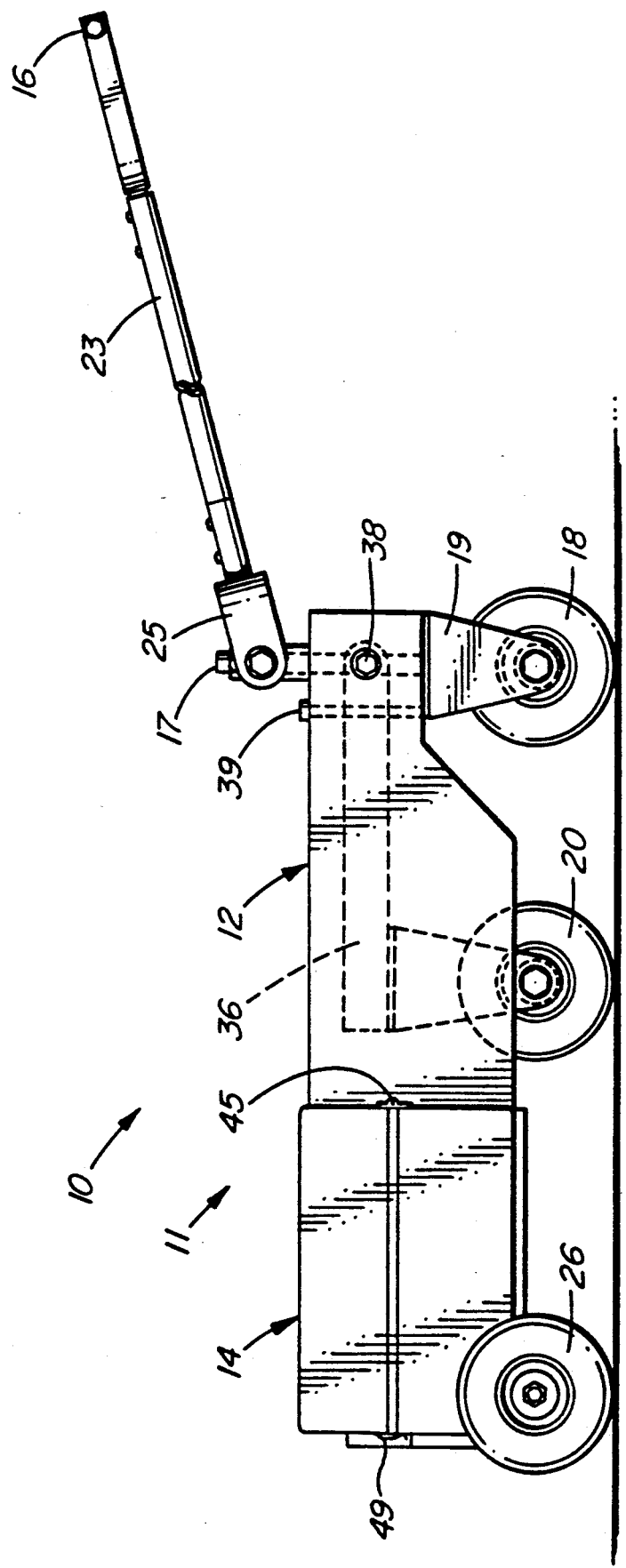
FIG. 3 is a side view of the profiler of FIG. 1.

With reference to FIG. 1–FIG. 3, a surface profiler is illustrated generally at 10. The surface profiler 10 has a body 11 comprising two interlocking members, i.e. a longitudinal portion 12 and a transverse portion 14. The longitudinal portion 12 comprises a chassis 13, a lockable steering assembly 15, a forward support wheel 18, and a sensing wheel 20. The transverse portion 14 comprises a chassis 22, a rear support and measurement wheel 24, a rear support wheel 26, and two compartments 28 and 30 with hinged lids 29 and 31, respectively. The compartments 28 and 30 and their lids 29 and 31 form weatherproof enclosures. They are conveniently constructed of aluminum.

The steering assembly 15 comprises a vertical steering axle 17, on which the wheel 18 is rotatably mounted through a wheel frame 19. A forwardly extending rod 23 is pivotally connected to the axle 17 through a fork member 25. The rod 23 terminates in a handle 16 by which the profiler 10 can be pulled forward by hand. The steering assembly 15 is lockable by means of a locking pin 39 (see FIG. 3) which engages with the wheel frame 19. The pin 39 has a conical point which engages with an opening (not shown) in the wheel frame 19 to lock the wheel 18 in a centre position, so that the wheel 18 travels in a straight line resulting in the wheel 20 travelling along the same line. In this regard it is important that the sensing wheel 20 lands on the same spot previously occupied by the wheel 18 when each successive inclination measurement, as will be described below, is made.

Apart from the steering assembly 15, alternative means for steering the profiler 10 may be employed, such as by using wired, wireless radio, fibre optic or infrared light remote controlled guidance signals or as a further alternative, guiding and controlling the linear path of travel of the vehicle using optical laser guidance.

Figure 4:
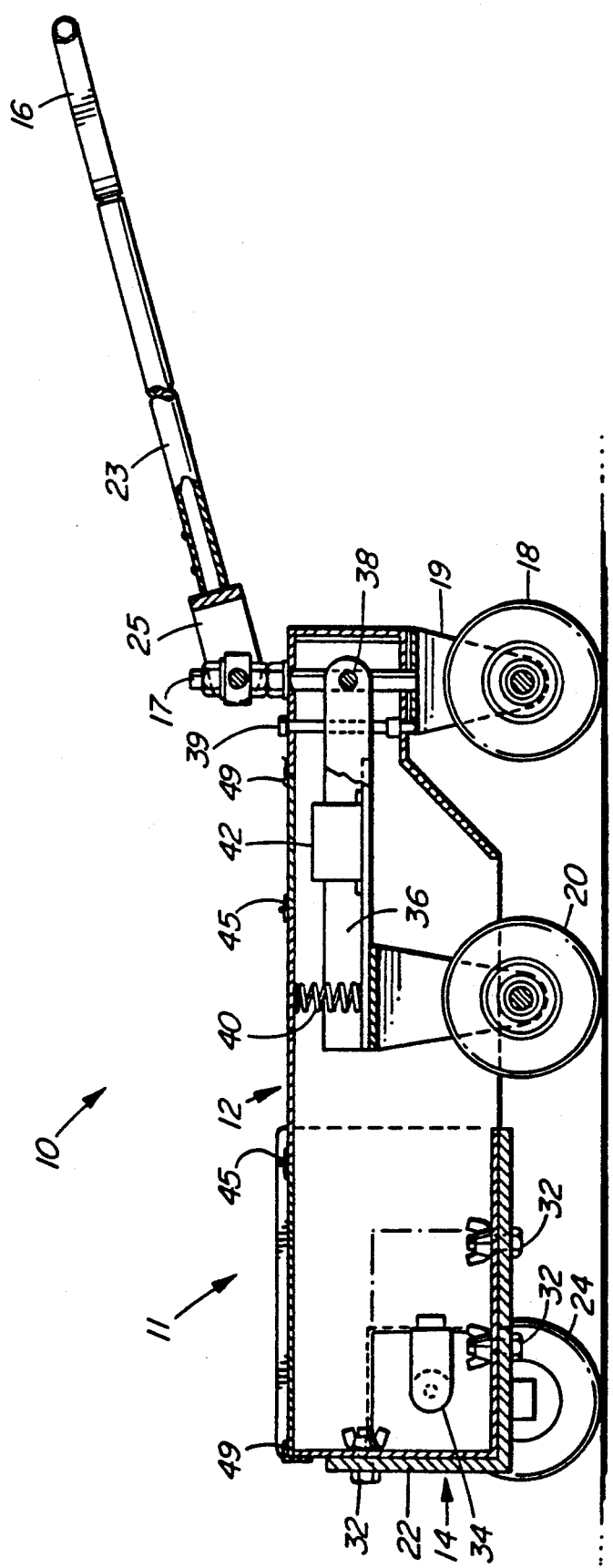
FIG. 4 is a section taken along the lines IV—IV in FIG. 2.

With reference to FIG. 4 and FIG. 5, the longitudinal portion 12 and the transverse portion 14 are joined by a plurality of bolt assemblies 32 by means of which the longitudinal portion 12 is bolted to the chassis 22. Electricity is exchanged between the compartments 28 and 30 by means of a plurality of electrical connectors 34. Reference numeral 43 in FIG. 6 and FIG. 7 indicates wheel axle supports. Reference numeral 45 indicates hinges and reference numeral 49 indicates latches. Conveniently the length of the profiler 10 is in the range of 0.5 m to 1.5 m to facilitate transport by aircraft.

With reference to FIG. 4 the sensing wheel 20 is mounted on one end of an arm 36, the other end of which is pivotally connected to the longitudinal portion 12, as shown at 38. As can be seen, the pivotal connection 38 is in a vertical plane containing the rotation axis of the wheel 18. As an alternative, the pivotal connection 38 of the arm 36 can be made to coincide with the rotation axis of the front wheel 18. The arm 36 is biased towards the ground by means of a spring 40 to counteract spurious bounce of the sensing wheel 20. With this arrangement, the sensing wheel 20 can follow the contours of the ground surface being traversed, while the arm 36 performs pivotal movement relative to the body 11. An inclinometer 42 is mounted on the arm 36 to measure the inclination of the arm 36 with respect to the horizontal position.

With reference to FIG. 6, a cross section of the compartment 30 is illustrated. The compartment 30 houses a battery 46 for supplying electrical power to the profiler 10 and a battery charger 44 for charging the battery 46. A partition 47 is provided between the charger 44 and the battery 46. The battery 46 is conveniently a gelatin electrolyte battery which conforms to IATA dangerous goods regulations so that the profiler 10 can be transported by aircraft.

With reference to FIG. 7 and FIG. 8, two cross sections of the compartment 28 are illustrated. The compartment 28 houses a pair of intermeshing gears 48 and 51. The gear 48 is located on the axle of the wheel 24 (see FIG. 5) and is driven by the rotation of the wheel 24. The gears 48 and 51 are conveniently of nylon. An optical encoder 50 and an interface circuit 52 (see FIG. 7) are provided to measure the rotation of the gears 48 and 51. An A/D converter and digital I/O circuit 54 is also provided to accept the electronic information from the optical encoder 50 and the inclinometer 42 and to transmit this information to a computer 56. The computer 56 is provided to control the collection of the electronic data. A P.C. port 58 and a cartridge clip 60 for a removable solid state memory device, such as a cartridge (not shown), to store and exchange electronic information between the computer 56 and an external computer (not shown) are also located in the compartment 28. Alternative means for storage of the distance and inclinometer data may be provided, such as a magnetic disk, magnetic tape, bubble or optical storage media. A keypad 62 for user input is located under the lid 29. Two DC/DC converters 64 and 66 to power the circuitry are also provided.

Figure 11:
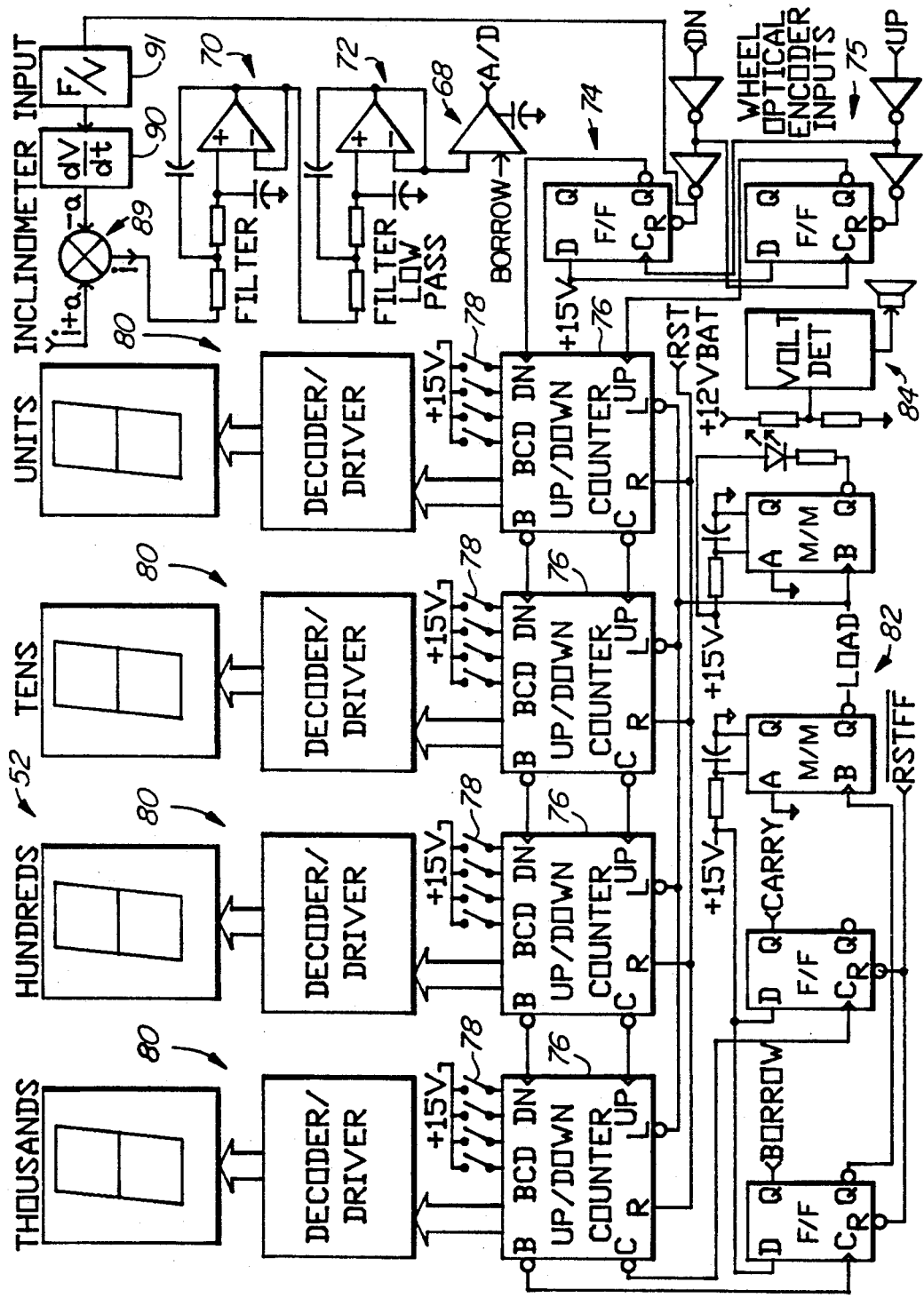
FIG. 11 is a schematic diagram of the optical encoder and inclinometer interface circuit of the profiler of FIG. 1.

With reference to FIG. 11, a schematic diagram of the optical encoder and inclinometer interface circuit 52 is illustrated. The interface circuit 52 comprises two circuits 70 and 72 to condition input from the inclinometer 42, sample and hold circuit 68, two flip flops 74 and 75 which steer pulses from the optical encoder 50, a plurality of presettable Binary Coded Decimal (BCD) up/down counters 76 cascaded together that count the state changes of the flip flops 74 and 75, a plurality of switches 78 which preset the counters 76, a plurality of digit displays 80 which display the current contents of the counters 76, an output stage 82, and a voltage sensor circuit 84 to visually and audibly warn the user when the supply voltage is unacceptably low.

In place of the optical encoder 50, alternative means for measuring the distance travelled intervals may be employed, such as using a wheel or rotating arm carrying one or more projections, such as gear teeth or optical target, and a position or proximity sensor using optical, magnetic reluctance, eddy current, capacitance, electrical switch, or similar means.

Alternative means for measurement of the inclination of the arm 36, other than a gravity driven pendulum-type transducer, such as the inclinometer 42, may be used, such as a gyroscopic transducer.

OPERATION

The surface profiler 10 is brought on site in two luggage type packages or cases 86 and 88 (FIG. 9) that house the longitudinal portion 12 and the transverse portion 14, respectively. Using the bolts 32 and the electrical connectors 34, the two portions 12 and 14 are interlocked to form the body 11 of the surface profiler The surface profiler 10 is pulled over a surface by using the handle 16 of the steering assembly 15. The steering assembly 15 can be used to manoeuvre the profiler 10, e.g. for steering it to the starting point of a measurement run, or it can be locked so that the profiler 10 will follow a straight line path during an actual measurement run.

The profiler 10 is supported by the wheels 18, 24, and 26. The wheel 24 is instrumental in measuring the distance that the profiler 10 has travelled, while the wheel 20 measures the relative elevation of points on a surface being traversed by the profiler 10.

As the wheel 24 rotates along the ground, it turns the gears 48 and 51. The turning of these gears is measured by the optical encoder 50, which generates a number of electrical pulses corresponding to a unit of distance measurement. Through the interface circuit 52, as will be described below, this distance information is conveyed to the computer 56. At distance intervals equal to the distance between the wheels 18 and 20, the computer 56 collects relative elevation information, as will be described below.

With reference to FIG. 4, the method by which the sensing wheel 20 measures the relative elevation of points on a surface is illustrated. The wheel 20, attached to the arm 36, is held against the surface being measured by both the force of gravity and the force of the spring 40. As the relative elevation of the points on the surface varies, the relative elevation of the sensing wheel 20 varies with respect to the front support wheel 18, causing the arm 36 to pivot about the pin 38. The inclinometer 42 mounted on the arm 36 detects the angle of the arm 36 with respect to the horizontal position, and through trigonometry, this information is converted into the relative elevation of the two wheels 20 and 18. At regular distance intervals, equal to the distance between the wheels 20 and 18, the computer 56 records the relative elevation information. When the profiler 10 has made a complete pass over a surface, it has collected a set of data at points relative to an initial point, describing elevation (in the form of angles of inclination) and distance from the initial point. The distance intervals at which the measurements are made can be varied to suit different requirements.

Figure 10:
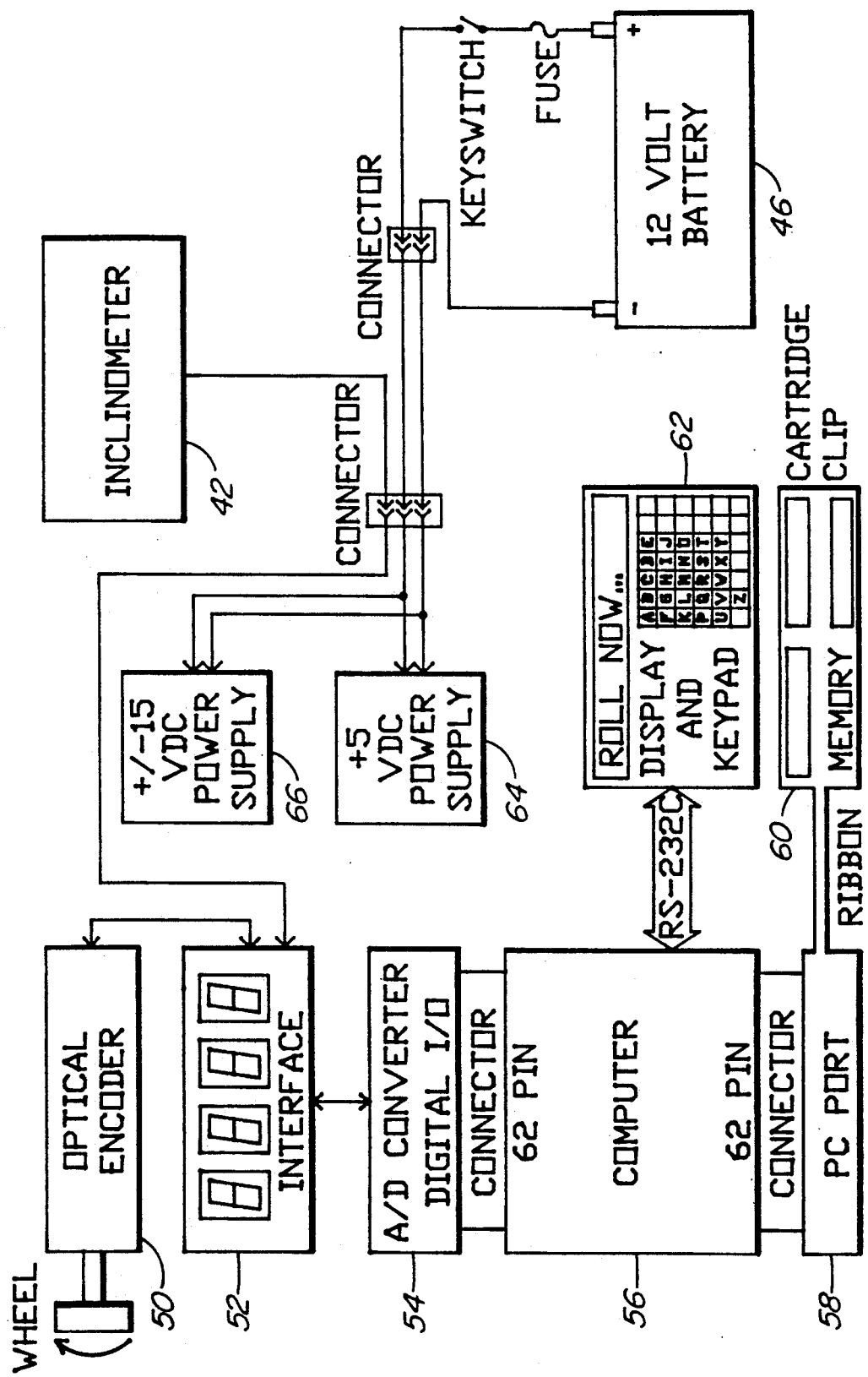
FIG. 10 is a block diagram of the electrical system of the profiler of FIG. 1.

With reference to FIG. 10, the inclinometer 42 transduces angular mechanical data into analog electrical data. This data is corrected by subtraction of acceleration and deceleration errors of the inclinometer analog electrical data by adding to it an equal in magnitude, but opposite in polarity, acceleration analog electrical signal derived by processing the pulses produced by the optical encoder 50. The optical encoder 50 transduces wheel 24 rotational mechanical data into digital electrical pulse data. Solid state counters count this electrical pulse data down from a preset value determined by the required distance measurement interval and, at the end of each distance measurement interval, when the count has reached zero, the counter flags the computer 56 to start the analog to digital conversion of the inclinometer analog electrical data. When this conversion is complete, the computer 56 inputs the distance and inclinometer digital electrical data and stores them in Random Access Memory (RAM). This data is processed in the computer 56 subject to a controlling program and at the completion of the data collection process is stored in a removable solid state memory device or cartridge clip 60 and PC port 58 for transference to an external computer (not shown) for calculations, analysis and graphical visual data display. For data collection, the user interacts with the computer 56 via the keyboard 62, entering commands and annotating data with comments and labels indicative of measurement conditions. For data output, a correction factor is applied to compensate for temperature drift of the inclinometer 42 based on ambient temperature prevailing at the time of test. Alternately a thermistor can be used to automate the temperature drift correction as the data is being collected. The whole circuit is powered by the battery 46 (which is charged on board with battery charger 44) with the aid of DC/DC convertors 64 and 66.

With reference now to FIG. 11, the working of the interface circuit 52 will be described. Since the inclinometer 42 uses gravity for determination of inclination, and may consequently be sensitive to longitudinal acceleration and deceleration of the vehicle, any acceleration and deceleration component of the inclinometer analog electrical data must be subtracted from the inclinometer analog electrical data using a difference amplifier 89. The acceleration analog electrical signal is obtained by first using a frequency to voltage convertor 91 to derive a velocity analog electrical data from the optical encoder 50 pulses and then differentiating this signal, with respect to time, using a derivative amplifier 90. The inclinometer analog electrical signal, now free of acceleration and deceleration error, is filtered by two two-pole active low pass operational amplifier filters 70 and 72 to eliminate spurious high frequency analog electrical data noise including vibration of the inclinometer, is stabilized by a sample and hold amplifier 68 and finally fed to the analog to digital convertor 54.

Two digital electrical pulse signals from the optical encoder 50, shifted 90 degrees each from the other, are sent to flip flop memories 74 and 75. These flip flops steer pulses to cascaded counters 76 to either the count down or count up inputs which, according to whether wheel 24 is rotating backward or forward, either increment or decrement respectively the cascaded counters 76.

Each counter 76 is preset with a switch 78 to count down a certain number of pulses before it borrows from the next stage counter to the left. By adjusting all of the switches 76 the user can alter the length of the distance measurement. The current count of each counter 76 is visually displayed at 80. The borrow signal from the final counter 76 is propagated to an output stage flip flop memory 82 which flags the computer to convert the inclinometer analog electrical signal now held at the sample and hold amplifier 68 to digital. At the same instant the cascaded counter 76 is again preset from switch 78 in preparation for measurement of the next distance interval.

The voltage sensor stage 84 continuously compares the power supply voltage to a stable precision reference voltage to determine whether the battery voltage is unacceptably low, in which case it produces digital electrical, audible and visual warnings.

Apart from using the derivative amplifier 90, as described and illustrated, alternative means may be employed for measurement of acceleration or deceleration of the profiler 10 for correction of the inclinometer analog electrical data, such as by inputting optical encoder pulse counter digital count data to the computer 56 at periodic time intervals. The computer 56 would then determine vehicle acceleration or deceleration by subtracting the count difference from one time interval to the next. Further alternative means of acceleration measurement may be employed, such as a piezoelectric accelerometer transducer.

Data is collected with the profiler 10 by hand towing the profiler 10 over the pavement surface at a normal walking speed, although it can also be driven by other means including towing by power driven vehicles and self propulsion using on board motors. Constant velocity of the profiler 10 is a primary consideration to avoid unwanted longitudinal acceleration influences on the inclinometer 42. The profiler 10 can be used for measuring transverse and longitudinal profiles during construction of runways and roads, which can then be analyzed to ensure that the prescribed specifications are being met. The profiler 10 can also be used for measuring longitudinal profiles over the length of the runway facility which can be analyzed to determine the location, type and relative elevation of roughness of the surface as it effects the ride of an aircraft during take-off, landing and taxiing operations.

Figure 12:
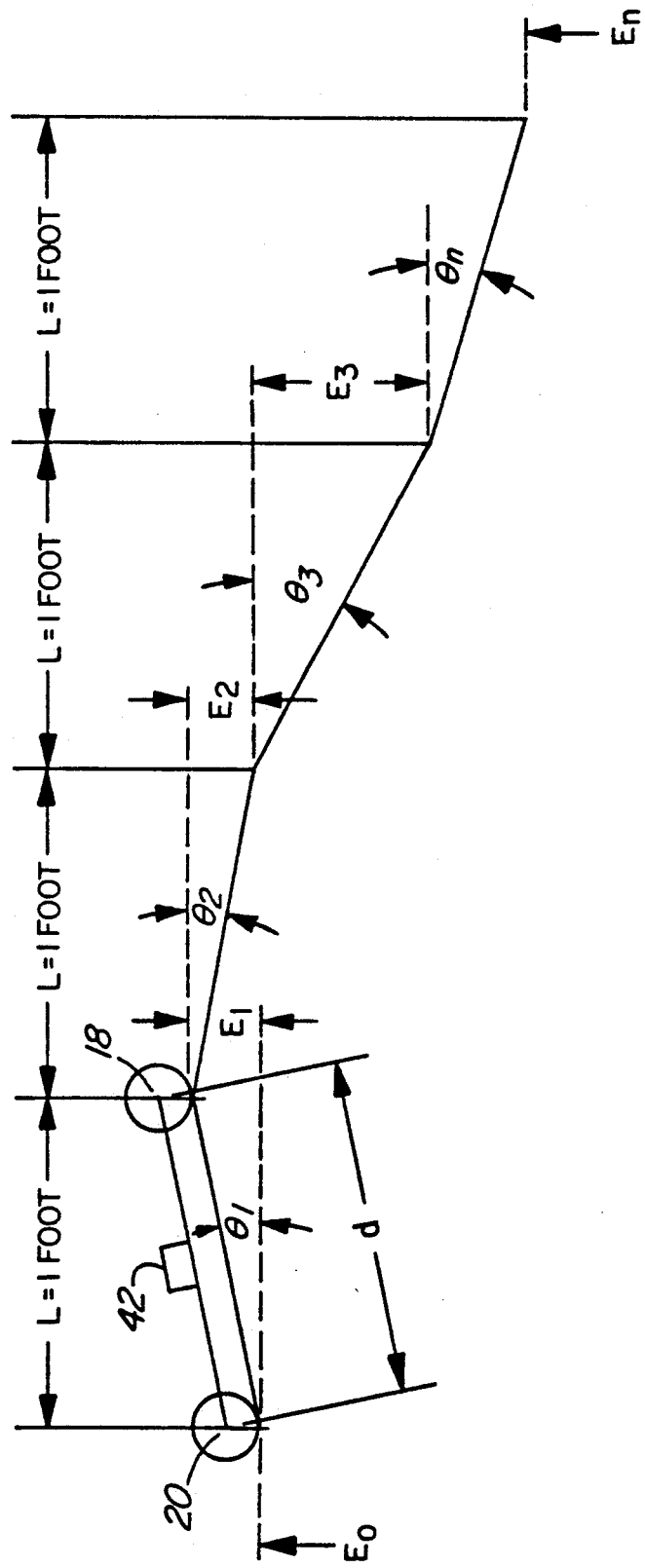
FIG. 12 is a schematic diagram illustrating the method employed by the invention for measuring the profile of a surface.

With reference to FIG. 12, the method employed by the invention is illustrated. As shown the method comprises measuring the angle of inclination Θ, between the horizontal position and a line subtended from the horizontal position through the rotation axis of the front wheel 18 to the rotation axis of the sensing wheel 20, at successive distance intervals (d) of 1 foot apart along the line of travel, which is the distance between the rotation axes of the wheels 18, 20. It will be appreciated that the distance (d) of 1 foot along the profile surface can be varied as desired. These distance measurements start at an elevation of $E_o$ at the starting point and end at elevation $E_n$ at the end of a measurement run. As seen the angle Θ can either be negative or positive. The inclinometer takes these successive angle measurements $Θ_1, Θ_2, Θ_3, \ldots, Θ_i, \ldots, Θ_n$ which are stored as the raw data in the cartridge. The data once transferred to the external computer is then processed to calculate the corresponding elevation data according to the formula:

$$\sin Θ_i = \frac{E_i}{d}$$

$$E_i = d \sin Θ_i$$

where
 $E_i$ = elevation change
 and d = 1 foot

Each successive elevation value is added to the previous value to obtain a profile, when represented graphically, such as shown in FIG. 12. The final elevation $E_n$ is given by:

$$E_n = E_o + d\sin Θ_1 + d\sin Θ_2 + \ldots + d\sin Θ_i + \ldots + d\sin Θ_n$$

It should be noted that for small angles of Θ the horizontal distance L closely approximates d, which is 1 foot. Alternatively, the computer 56 could be programmed to preset the cascading counters 76 to maintain constant horizontal intervals L of 1 foot irrespective of the angle.

Instead of using an external computer for processing the calculations, the profiler 10 may be provided with an onboard computer for doing so, or instead of transferring the raw data to a removable solid state storage device, the computer 56 may be coupled to the external computer to effect the data transfer.

The profiler 10 also has a capability for field input of data identifying the profile i.e. airport name, pavement facility (runway number), starting chainage and bench mark elevation, offset location, test time and date, user I.D. weather conditions and temperature.

While only preferred embodiments of the invention have been described herein in detail, the invention is not limited thereby and modifications can be made within the scope of the attached claims.

What is claimed is:

1. Surface profiling apparatus, comprising:
 a support member having a forward support wheel and a rearward support wheel for travel along a surface, the profile of which is to be measured;
 a sensing arm, having a longitudinal axis and connected to the support member for pivotal movement relative to the support member about a pivotal axis extending transversely of said longitudinal axis;
 a ground engaging wheel at one end of the sensing arm and said forward support wheel being located at the opposite end of said sensing arm, said forward support wheel and said ground engaging wheel being arranged for rotation about rotation axes parallel to said pivotal axis, said forward support wheel being mounted on said support member and being fixed relative to said pivotal axis of said sensing arm, said forward support wheel and said ground engaging wheel being spaced apart longitudinally of the arm by a predetermined distance and arranged for travel along substantially the same line during rectilinear travel of the support member along said surface;
 inclination measuring means for measuring the orientation of the longitudinal axis of the sensing arm with respect to the horizontal position;
 said pivotal axis being spaced apart in a vertical plane containing the rotation axis of said forward support wheel.

2. The apparatus according to claim 1, further comprising distance measuring means on the apparatus for determining distance travelled by the support member and wherein said inclination measuring means measures said orientation, responsive to said distance measuring means, at successive intervals substantially equal to the distance between said rotation axes.

3. The apparatus according to claim 2, further comprising acceleration deriving means on the apparatus for measuring acceleration of the support member during travel along said surface.

4. The apparatus according to claim 3, further comprising means on the apparatus for measuring ambient air temperature.

5. The apparatus according to claim 4, and further comprising shock absorbing means on said sensing arm for maintaining said ground engaging wheel in contact with said surface.

6. The apparatus according to claim 5, wherein said forward support wheel is pivotable about a vertical axis for steering the support member.

7. The apparatus according to claim 6, further comprising means for locking said forward support wheel in a central position.

8. The apparatus according to claim 7, further comprising a rod on the support member for drawing the support member along said surface.

* * * * *